(12) United States Patent
Bosworth et al.

(10) Patent No.: US 10,562,135 B2
(45) Date of Patent: Feb. 18, 2020

(54) WELDING GROUND APPARATUS

(71) Applicant: HUYS INDUSTRIES LIMITED, Weston (CA)

(72) Inventors: Robert Bosworth, Brantford (CA); Kevin Chan, North York (CA); Nigel Scotchmer, Willowdale (CA)

(73) Assignee: Huys Industries Limited, Weston (CA)

( * ) Notice: Subject to any disclaimer, the term of this patent is extended or adjusted under 35 U.S.C. 154(b) by 25 days.

(21) Appl. No.: 15/971,696

(22) Filed: May 4, 2018

(65) Prior Publication Data

US 2018/0318971 A1 Nov. 8, 2018

Related U.S. Application Data

(60) Provisional application No. 62/502,487, filed on May 5, 2017, provisional application No. 62/517,589, filed on Jun. 9, 2017.

(51) Int. Cl.
| | |
|---|---|
| *B23K 37/00* | (2006.01) |
| *H01R 13/22* | (2006.01) |
| *H01R 13/648* | (2006.01) |
| *B23K 9/32* | (2006.01) |
| *B23K 9/167* | (2006.01) |
| *B23K 9/173* | (2006.01) |
| *H01R 4/56* | (2006.01) |
| *H01R 13/24* | (2006.01) |

(52) U.S. Cl.
CPC .......... *B23K 37/006* (2013.01); *B23K 9/167* (2013.01); *B23K 9/173* (2013.01); *B23K 9/32* (2013.01); *H01R 13/22* (2013.01); *H01R 13/648* (2013.01); *H01R 4/56* (2013.01); *H01R 13/2421* (2013.01)

(58) Field of Classification Search
CPC . H01R 4/56; H01R 4/64; H01R 4/643; H01R 13/22; H01R 13/2421; H01R 13/648; H01R 11/26; H01R 4/66; B23K 37/006; B23K 9/167; B23K 9/173; B23K 9/32
USPC .......................................... 439/8, 92, 95, 96
See application file for complete search history.

(56) References Cited

U.S. PATENT DOCUMENTS

| | | | | |
|---|---|---|---|---|
| 3,034,082 | A * | 5/1962 | Rayon | H01R 4/64 439/271 |
| 3,757,080 | A * | 9/1973 | Gstohl | H01R 4/64 219/161 |
| 4,083,624 | A * | 4/1978 | Timmer | H01R 11/26 269/249 |
| 5,073,121 | A * | 12/1991 | Jaenke | H01R 4/26 439/387 |
| 5,087,206 | A * | 2/1992 | Jaenke | H01R 13/523 439/433 |

(Continued)

OTHER PUBLICATIONS

Welker Engineered Products, ISO 9001 Registered, GB3 Ground Block Retract Cylinder, pp. 1-4; May 3, 2017, www.welkerproducts.com.

*Primary Examiner* — Oscar C Jimenez
(74) *Attorney, Agent, or Firm* — Ridout & Maybee LLP

(57) ABSTRACT

A welding ground apparatus comprising at least two members, the at least two members engaged and having at least one angular degree of freedom between them, the grounding apparatus including a biasing member for applying a force to at least one of the at least two members when compressed, the line of action of the force traversing a contact footprint, the contact footprint having a footprint periphery and defined by one of the at least two members.

18 Claims, 11 Drawing Sheets

(56) References Cited

U.S. PATENT DOCUMENTS

| | | | | |
|---|---|---|---|---|
| 5,199,887 | A * | 4/1993 | Iacono | H01R 9/0515 |
| | | | | 439/581 |
| 5,746,609 | A * | 5/1998 | Franks, Jr. | H01R 4/36 |
| | | | | 439/443 |
| 5,928,006 | A * | 7/1999 | Franks, Jr. | H01R 4/66 |
| | | | | 439/443 |
| 6,422,886 | B1 * | 7/2002 | Macbeth | H01R 13/6315 |
| | | | | 439/247 |
| 7,363,683 | B2 * | 4/2008 | Wagner | G02C 5/2236 |
| | | | | 16/228 |
| 9,590,359 | B1 * | 3/2017 | Patterson | H01R 13/6473 |
| 9,818,502 | B1 * | 11/2017 | Petrucci | H01B 5/02 |
| 2004/0182593 | A1 * | 9/2004 | Sumner | H01R 11/15 |
| | | | | 174/87 |
| 2009/0258548 | A1 * | 10/2009 | Kossak | F16B 2/065 |
| | | | | 439/803 |
| 2010/0267258 | A1 * | 10/2010 | Lee | H01R 4/66 |
| | | | | 439/97 |
| 2011/0081810 | A1 * | 4/2011 | Flojo | H01R 4/30 |
| | | | | 439/803 |
| 2012/0270425 | A1 * | 10/2012 | Rae | B23K 31/02 |
| | | | | 439/92 |
| 2014/0327303 | A1 * | 11/2014 | Naganishi | H01R 4/64 |
| | | | | 307/10.1 |
| 2015/0325939 | A1 * | 11/2015 | Kim | B23K 33/002 |
| | | | | 439/700 |

\* cited by examiner

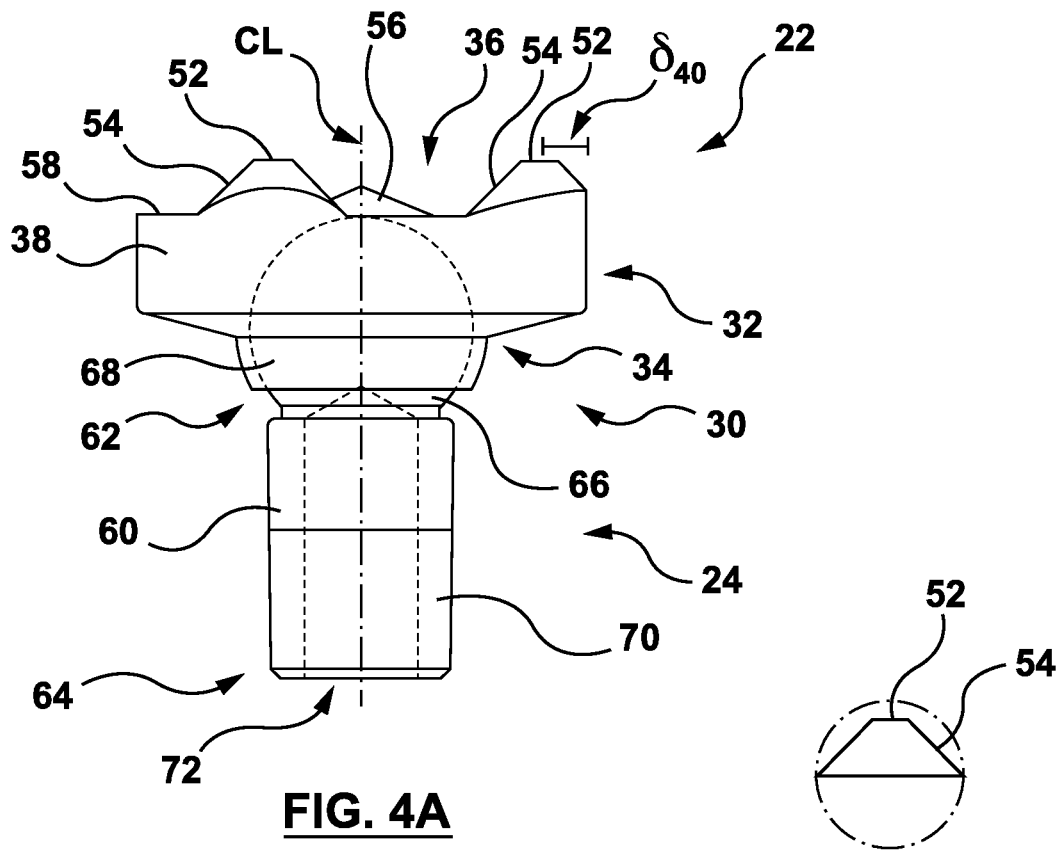
FIG. 4A
FIG. 4C
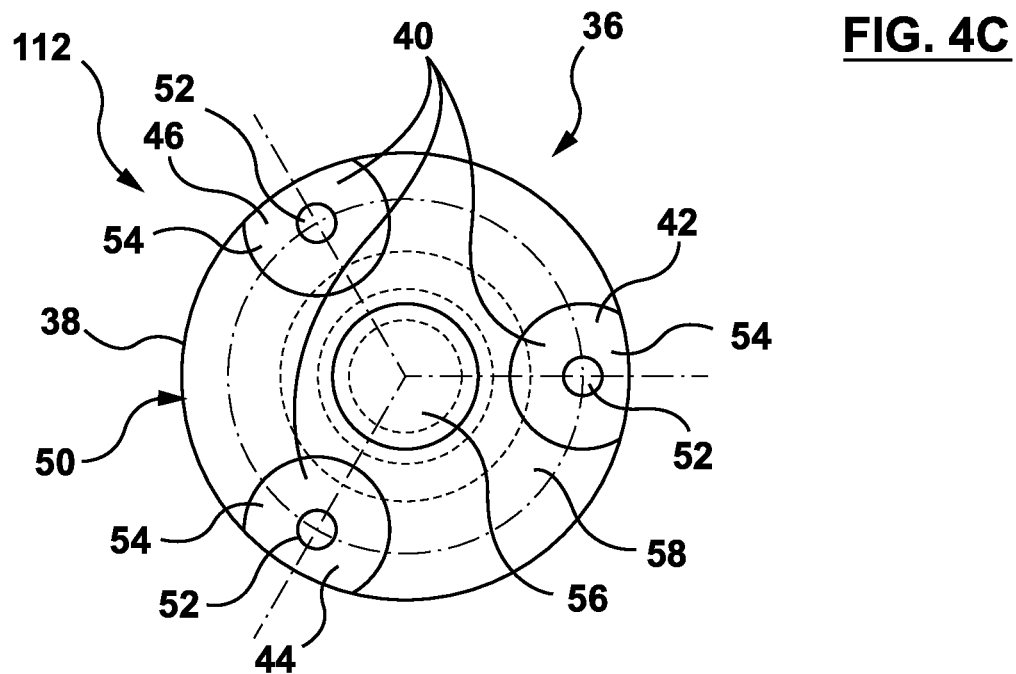
FIG. 4B

WELDING GROUND APPARATUS

CROSS-REFERENCE TO RELATED APPLICATIONS

This application claims the benefit of U.S. Provisional Patent Application 62/502,487 filed May 5, 2017 and of U.S. Provisional Patent Application 62/517,589 filed Jun. 9, 2017, the specifications thereof being incorporated in their entirety herein by reference.

FIELD OF THE INVENTION

This invention relates to the field of welding equipment.

BACKGROUND OF THE INVENTION

During welding operations, particularly Metal Inert Gas (MIG) and Tungsten Inert Gas (TIG) welding, an electrically conductive connection between the target surface being welded and the ground connection is often desired. A poor ground connection during welding may lead to arcing and poor weld quality. A poor ground connection may also lead to greatly increased heat at the welding torch, which may lead to a short torch and consumables life.

A ground connection may be established for a workpiece by a welding ground apparatus. In some circumstances such an apparatus may be required to make repeated contacts with a target surface of a workpiece despite surface inconsistencies. In the past, at times a C-clamp ground apparatus or a vise-grip grounding apparatus may be used to ensure a good ground connection. However, such apparatus may not be easily and quickly engaged and disengaged.

Ground apparatus are often made of material that is predominantly steel or bronze to withstand the rigorous use to which they are put. Even where a copper coating is applied to a contact surface to facilitate a conductive connection, the softer copper is easily damaged, particularly with a C-clamp or vise-grip grounding device when the operator tightens the clamp and the copper coating is squeezed out or otherwise destroyed.

To facilitate a conductive connection, a ground apparatus may have asperities or serrated contact surfaces for contacting a target surface. However, such surfaces may dig into or otherwise deface the target surface.

SUMMARY OF THE INVENTION

In an aspect of the invention there is a grounding apparatus. It has a first member defining a contact footprint, the contact footprint having a footprint periphery. It has a second member engaged with the first member and having at least a first angular degree of freedom relative to the first member. It also has a biasing member mounted to apply a force to the second member along a line of action when the biasing member is compressed, the line of action of the force traversing the contact footprint within the footprint periphery.

In a feature of that aspect of the invention, the second member has at least a second angular degree of freedom relative to the first member.

In a feature of that aspect of the invention, one of the first member and the second member defines a male fitting and the other defines a female fitting, and the first and second members are engaged by a joint formed by the male and female fittings. In a further feature of that aspect of the invention, the male fitting is a male ball and socket fitting and the female fitting is a female ball and socket fitting. In still a further feature of that aspect of the invention, the first member is engaged with the second member substantially opposite the contact footprint.

In another feature of that aspect of the invention, the first member includes a plurality of feet and the contact footprint is defined by the plurality of feet. In another feature of that aspect of the invention, the plurality of feet defines a plurality of contact surfaces, each contact surface in a common contact plane. In another feature of that aspect of the invention, the plurality of contact surfaces are a plurality of flat contact surfaces in the contact plane. In another feature of that aspect of the invention, the plurality of contact surfaces are a plurality of flat circular contact surfaces having a diameter of at least 0.1 inches. In another feature of that aspect of the invention, the plurality of contact feet are evenly spaced about the footprint periphery.

In another feature of that aspect of the invention, the first member further includes a reference projection, the axis of the reference projection traversing the contact footprint within the footprint periphery. In another feature of that aspect of the invention, the reference projection is centered between the plurality of feet. In another feature of that aspect of the invention, the common contact plane lies beyond the extension of the reference projection. In another feature of that aspect of the invention, the common contact plane lies at least 0.1 inch beyond the extension of the reference projection.

In another feature of that aspect of the invention, the first and second members are made of a material that is predominantly copper.

In another feature of that aspect of the invention, the second member defines an exterior surface and an interior space with a port extending from the interior space to the second exterior surface. In another feature of that aspect of the invention, the interior space extends along substantially the entire length of the second member.

In another feature of that aspect of the invention, the biasing member includes a first biasing member, a second biasing member, and at least one spring, the first biasing member and the second biasing member restrained from separating from one another beyond a biasing member extension distance, and the at least one spring captured between the first biasing member and the second biasing member. In another feature of that aspect of the invention, the at least one spring comprises at least three springs equally distant from, and parallel to, the axis of the biasing member, the springs are spaced regularly from one another.

In another feature of that aspect of the invention, the plurality of feet is three feet evenly spaced about the footprint periphery, each of the three feet defining a circular contact surface, the second member having a tapered shaft for inserting into the biasing member, and the second member defining an interior space, an exterior surface, and a port extending from the interior space to the exterior space, the port being at the end of the tapered shaft. In another feature of that aspect of the invention, the biasing member includes a linear actuator. In another feature, the linear actuator includes a servo motor. In an alternate feature, the linear actuator includes a pneumatic cylinder. In still another feature, the apparatus is free of resilient members between the linear actuator and the first member.

In another aspect of the invention there is a grounding apparatus. It has at least a first member and a second member. The first member and the second member are mutually engaged. The first member includes a workpiece engagement interface. The workpiece engagement interface defines a contact footprint. The second member defines a base. There is at least one angular degree of freedom between the first member and the second member when they are mutually engaged. The second member is biased along a line of action. The line of action traverses the contact footprint.

In another aspect of the invention there is a method of using the grounding apparatus, comprising contacting each of the plurality of contact surfaces with a target surface; defining a compression distance as the distance between the reference projection and the target surface; and advancing the biasing member towards the target surface by the compression distance.

These and other aspects and features of the invention may be understood with reference to the description which follows, and with the aid of the illustrations of a number of examples. The various features identified above may be combined with the aspects in many combinations and permutations.

BRIEF DESCRIPTION OF THE DRAWINGS

The description is accompanied by a set of illustrative figures in which:

FIG. 4A is a side view of a contact head of the apparatus of FIG. 1;

FIG. 4B shows a top view of the contact head of FIG. 4A;

FIG. 4C shows a side view of a foot of the contact head of FIG. 4A;

DETAILED DESCRIPTION

Figure 1:
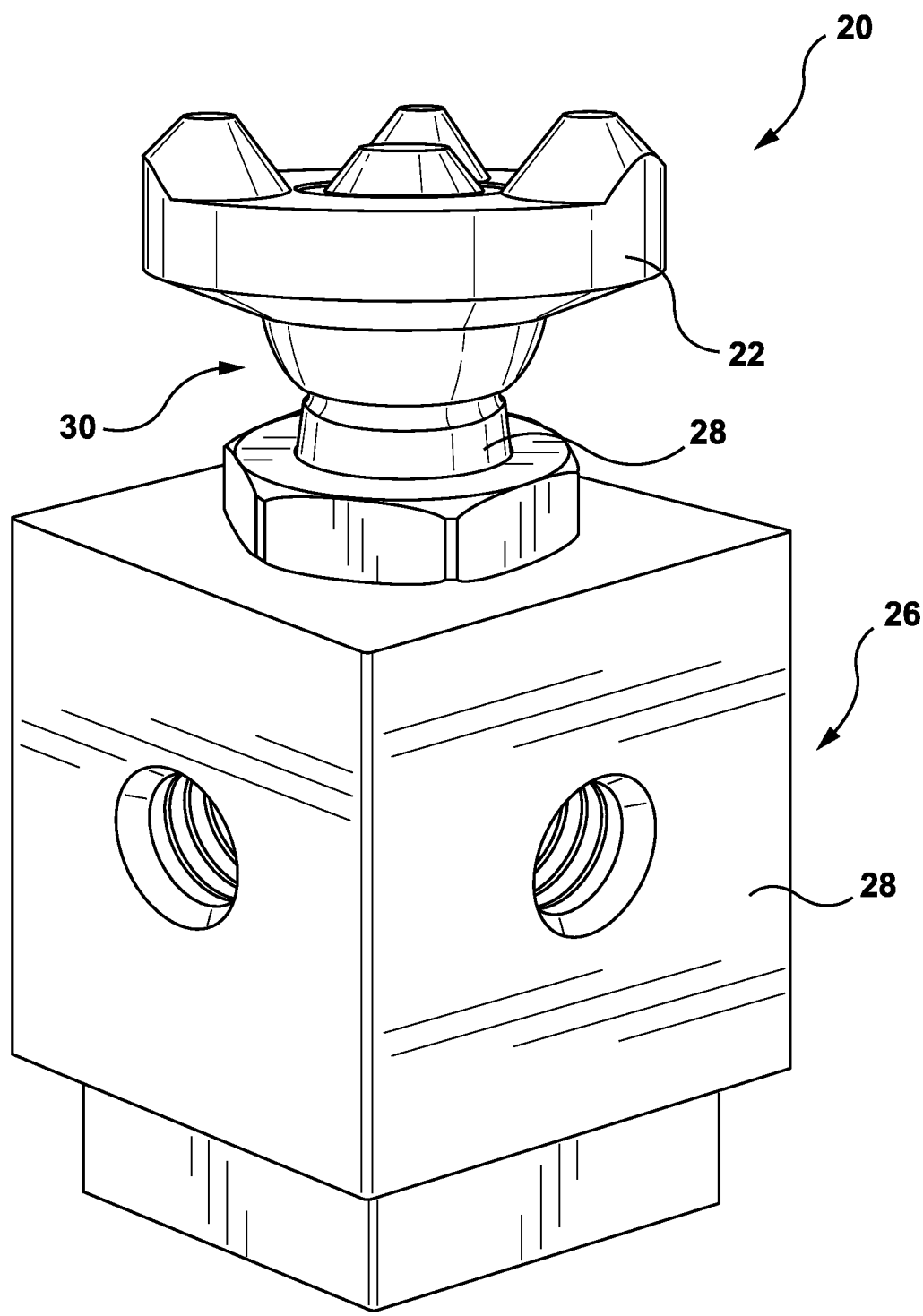
FIG. 1 shows a perspective view of a welding ground apparatus.

The description that follows, and the embodiments described therein, are provided by way of illustration of an example, or examples, of particular embodiments incorporating one or more of the principles, aspects and features of the present invention. These examples are provided for the purposes of explanation, and not of limitation, of those principles and of the invention. In the description, like parts are marked throughout the specification and the drawings with the same respective reference numerals. The drawings may be understood to be to scale and in proportion unless otherwise noted. The wording used herein is intended to include both singular and plural where such would be understood, and to include synonyms or analogous terminology to the terminology used, and to include equivalents thereof in English or in any language into which this specification many be translated, without being limited to specific words or phrases.

The scope of the invention herein is defined by the claims. Though the claims are supported by the description, they are not limited to any particular example or embodiment, and any claim may encompass processes or apparatus other than the specific examples described below. Other than as indicated in the claims themselves, the claims are not limited to apparatus or processes having all of the features of any one apparatus or process described below, or to features common to multiple or all of the apparatus described below. It is possible that an apparatus, feature, or process described below is not an embodiment of any claimed invention.

The terminology used in this specification is thought to be consistent with the customary and ordinary meanings of those terms as they would be understood by a person of ordinary skill in the art in North America. The Applicants expressly exclude all interpretations that are inconsistent with this specification, and, in particular, expressly exclude any interpretation of the claims or the language used in this specification such as may be made in the USPTO, or in any other Patent Office, other than those interpretations for which express support can be demonstrated in this specification or in objective evidence of record, demonstrating how the terms are used and understood by persons of ordinary skill in the art, or by way of expert evidence of a person or persons of experience in the art.

The commonly used engineering terms "proud", "flush" and "shy" may be used herein to denote items that, respectively, protrude beyond an adjacent element, are level with an adjacent element, or do not extend as far as an adjacent element, the terms corresponding conceptually to the conditions of "greater than", "equal to" and "less than". Inasmuch as this specification relates to an electrode or electrode holder, such as a grounding electrode, there may be a cylindrical polar co-ordinate system having an axial direction, a radial direction extending away from the axial direction along the electrode centerline, and a circumferential or peripheral direction.

By way of general overview, a welding ground apparatus is shown in the Figures as 20. Welding ground apparatus 20, which may be termed a grounding contact head, has a first member 22 and a second member 24. Second member 24 may include a third member 26, which may include a biasing member, or members, 28. First member 22 and second member 24 are mutually engaging at a connection or joint 30. Joint 30 has at least one angular degree of freedom.

In some embodiments, when second member 24 is held, such as in a tool, or robot, when apparatus 20 is advanced to cause first member 22 to contact a workpiece, biasing member 26 is deflected, or compressed, such that a spring pre-load is provided to apply a force to first member 22, causing it to stay in contact with the workpiece. In other embodiments, when second member 24 is held, such as in a tool, or robot, when apparatus 20 is advanced to cause first member 22 to contact a workpiece, biasing member 26 is pressurized or filled or actuated such that a piston pre-load is provided to apply a force to first member 22, causing it to stay in contact with the workpiece.

The force can be calibrated by sensing the compression distance through which second member 24 is advanced after statically determinate contact is made between the engagement interface of first member 22 with the workpiece. The angular degree of freedom of motion of first member 22 permits the orientation of first member 22 to self-adjust to conform to the surface of the workpieces as first member 22 is brought into engagement therewith. As may be understood, each of first member 22 and second member 24 is electrically conductive. In the embodiment shown, they are made of copper, or a suitable copper alloy.

First member 22 may be a termed a workpiece engagement member. It may have a body 32. One end or face or side of body 32 may have, or may define, an engagement fitting 34 for interaction with second member 24. Another face or side of body 32 may have, or may define a workpiece engagement interface, or engagement array 36. Fitting 34 and array 36 may be opposed, i.e., they may be on opposite sides of body 32.

Figure 4D:
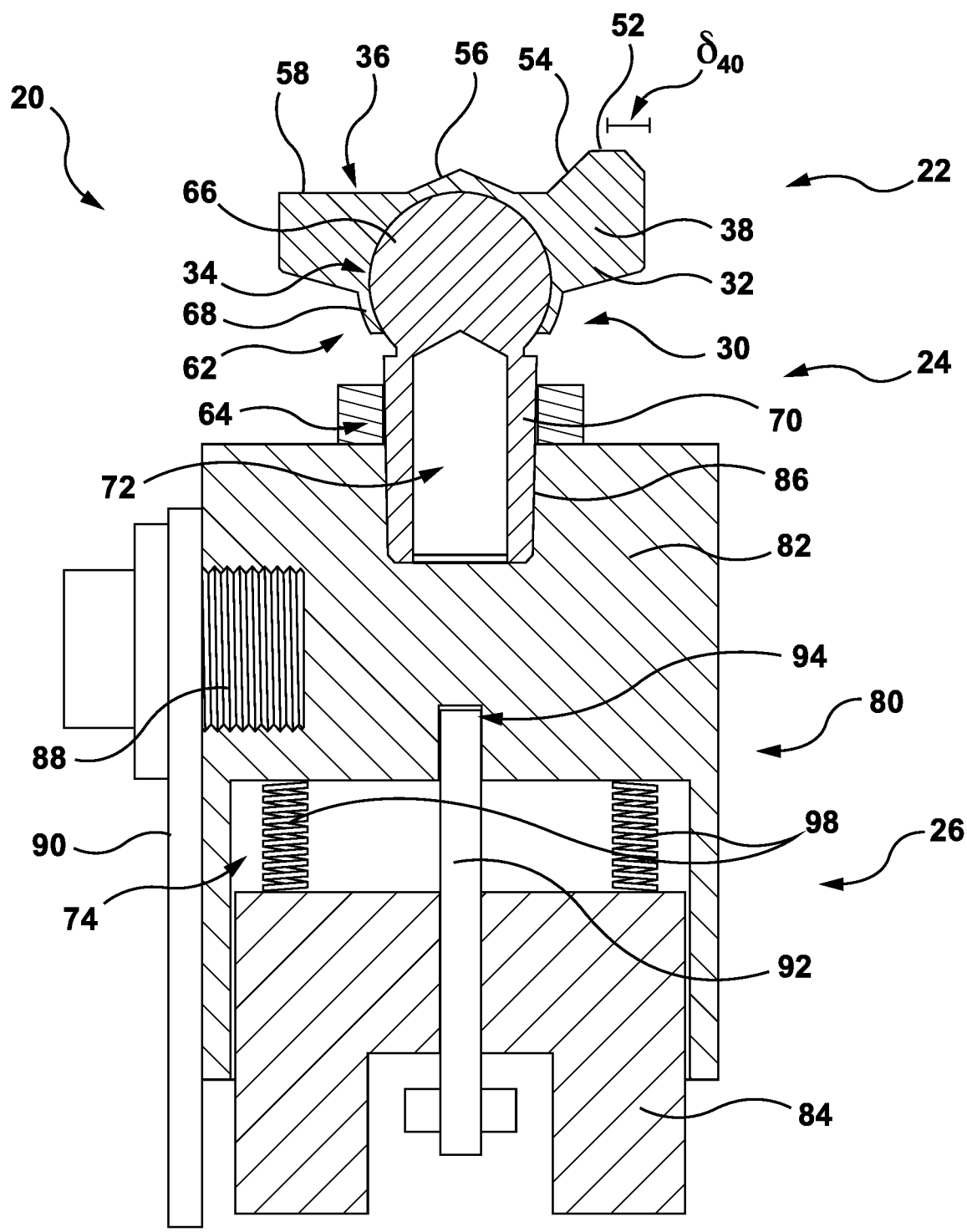
FIG. 4D shows a cross section of the welding ground apparatus of FIG. 1.
Figure 5:
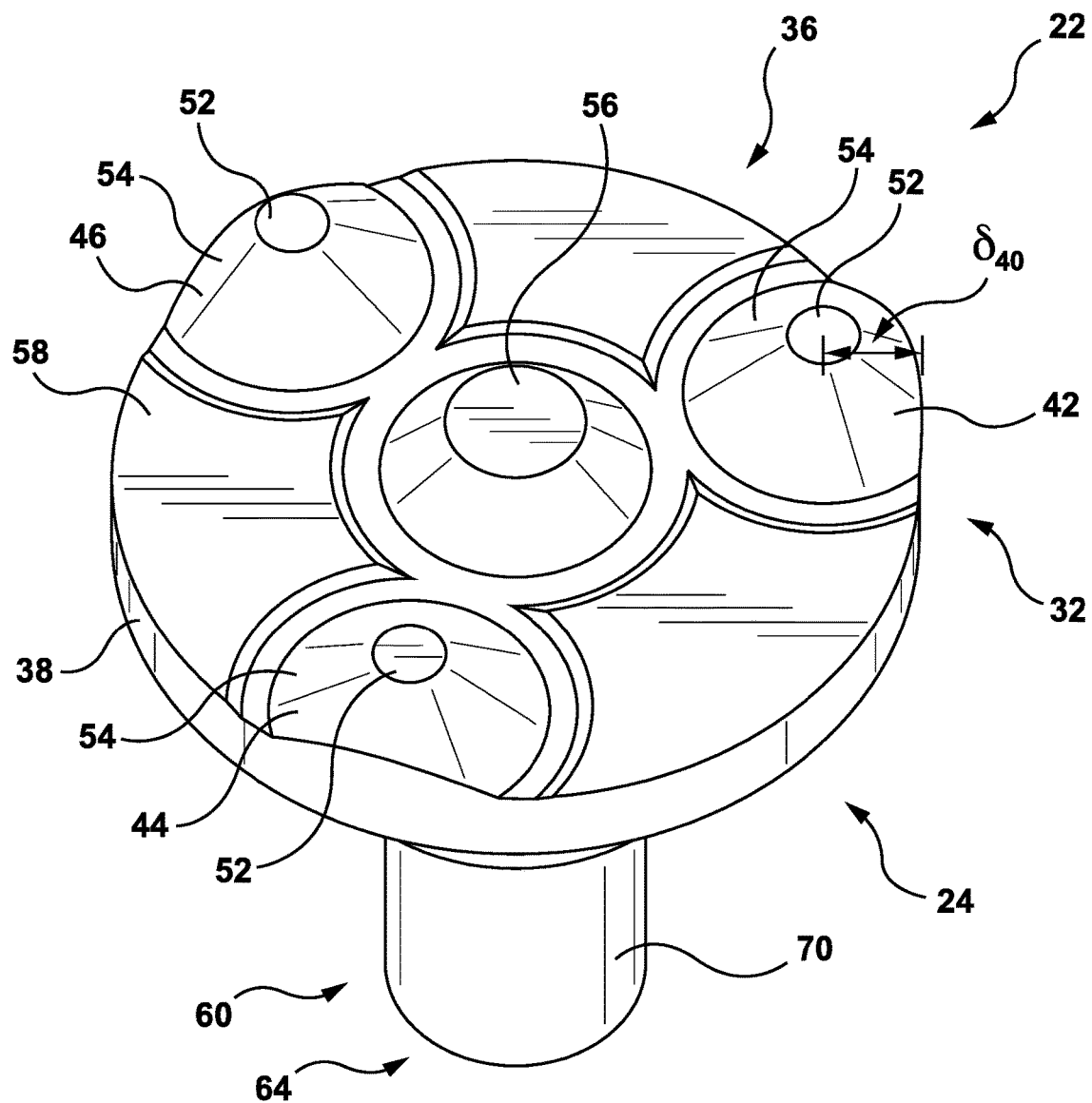
FIG. 5 shows a perspective view of the contact head of FIG. 4A.
Figure 6:
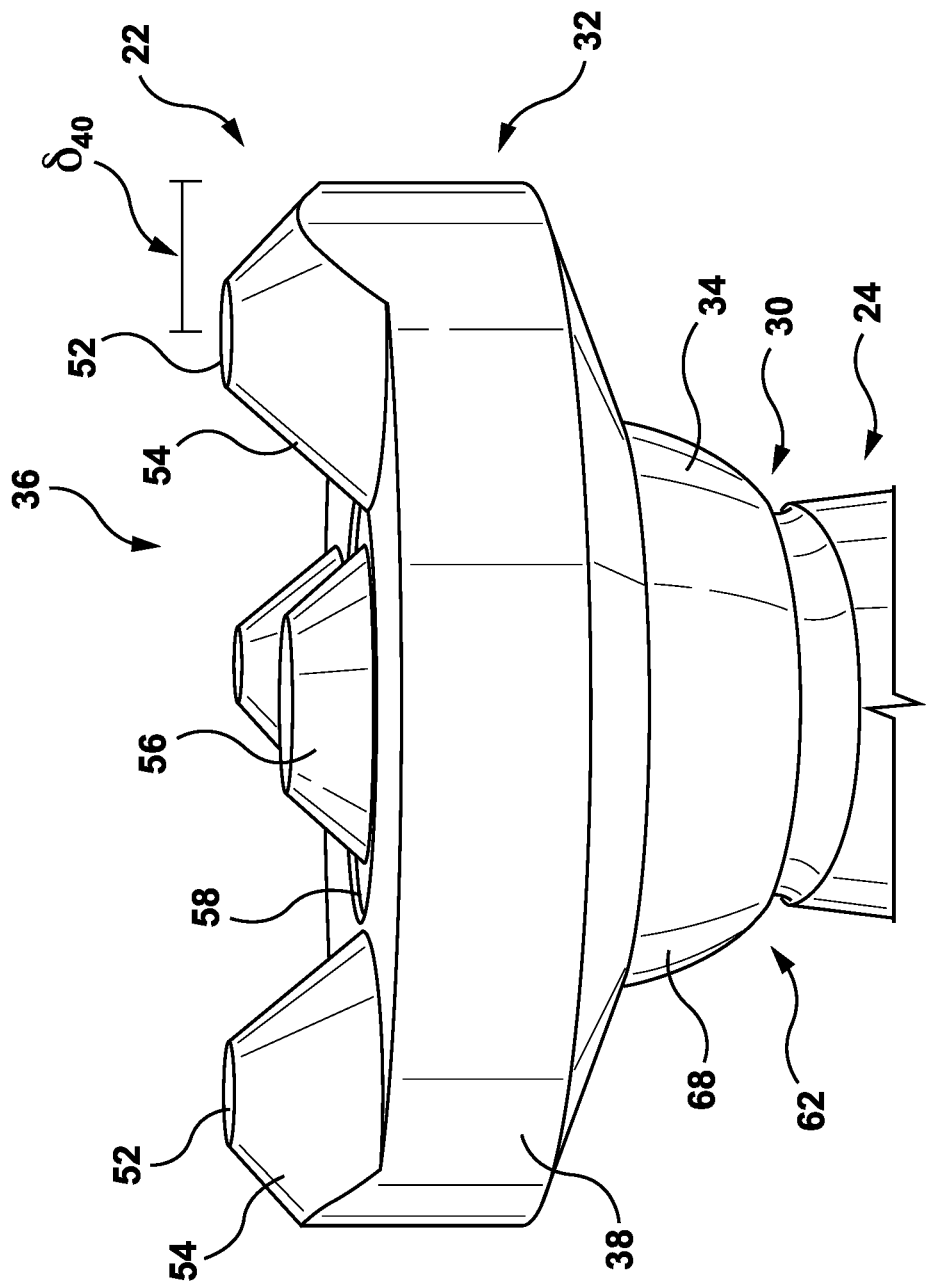
FIG. 6 shows a perspective side view of the contact head of FIG. 4A.

The main portion of body 32 may extend like a flange or plate, 38. The shape of plate 38 is arbitrary. It could be square or rectangular when viewed in plan view as in FIG. 4B. In the embodiment shown it is round, i.e., circular. Array 36 may include a set of feet 40, with first, second, and third individual feet indicated as 42, 44 and 46 respectively. Feet 40 stand axially forward, or proud, of plate 38, a distance $h_{40}$. Feet 40 define a statically determinate footprint. That is to say, if a perimeter 50 is drawn tightly about array 36 such that all of feet 40 are inscribed within the perimeter, a force acting along a line of action transverse (typically perpendicular) to the area enclosed by that perimeter, acting through any point within the perimeter, will not cause body 32 to tip over. Typically, a seating force may be applied at or near the center, or centroid, of footprint 50 as so defined. Body 32 may be a body of revolution, and may have a centerline axis CL. Body 32 may have symmetry about the centerline, and the centerline axis may be identified as the x-axis. It defines the "axial direction".

Although the set of feet could be spaced at different radii from the centerline, and although they could be spaced at uneven circumferential angular distances from each other, it is convenient that there be three feet, that the feet be spaced at the same radii from the centerline, and that they be spaced on equal 120 degree spaced centers about the centerline. Further, while each of feet 40 could be individually shaped—some round, some square, some rectangular or oval, or kidney shaped, or crescent shaped, or otherwise arbitrarily shaped—it is convenient that all of feet 40 be the same size and shape. In the embodiment illustrated, each of feet 42, 44, and 46 has a tip 52 having a circular contact area. The contact area may be flat or substantially flat, or very gently crowned on a large radius. In the embodiment shown the tip is flat. The flat has a substantial diameter—as shown being greater than 1/10 inch. The flats of tips 52 of feet 42, 44, 46 may be co-planar as shown. Each foot has a tapered, broadening skirt or flank, or flanks 54 extending readwardly away from tip 52 toward plate 38. Although each foot 42, 44, 46 could be pyramid shaped with trapezoidal or prismatic sides, in the embodiment shown each foot has a single flank formed on a conical section, the conical section being truncated at tip 52 and plate 38. The slope of the taper could be in the range of about 30 to about 60 degrees from vertical, and in the embodiment illustrated it is 45 degrees. To the extent that the base radius of the conical section exceeds the radial inset distance $\delta_{40}$ of the centerline of tip 52 from the outside circumference of plate 38, the radially outermost portion of flank 54 may be trimmed to conform to the outside circumference of plate 38.

It may also be beneficial for such an apparatus to have indicators to show when the device needs to be replaced due to wear. In the embodiment shown, the workpiece engagement side of body 32 also includes a datum or indexing, or reference member, in the form of a protrusion 56. Protrusion 56 may be a conical or hat shaped nubbins or spur that stands axially proud of the workpiece-facing surface 58 of plate 38 by some height $h_{56}$. Protrusion 56 also stands shy of the flats of tips 52. That is, $h_{56}$ is less than $h_{40}$ by some clearance distance, $\delta_x$. In use protrusion 56 may function as a wear indicator relative to tips 52, i.e., as tips 52 wear down, the difference in height becomes smaller, until such time as first member 22 requires replacement. Alternatively, where optical sensors are used, the controller may sense the distance between the tip of protrusion 56.

Second member 24 has a body 60 having a first end 62 and a second end 64. First end 62 may have, or may be formed in the shape of, an engagement fitting 66 that mates with engagement fitting 38 of first member 22. Fittings 66 and 38 are mutually engaging, and that, when mutually engaged they permit at least a first degree of freedom of angular motion therebetween, such that first member 22 pivot relative to second member 24. There are many possible types of engagement. In the embodiment shown, fitting 66 is a male socket fitting, and fitting 38 is a female socket fitting. It is arbitrary which fitting is male, and which fitting is female. In the embodiment shown, the fittings are mating spherical fittings such that the connection can pivot in any direction. The female fitting includes a retainer ring or skirt 68 that captures the male fitting and prevents disengagement. The spherical male fitting is undercut at its neck to permit larger relative angular displacement of the female fitting.

Second end 64 may have the form of a root or shank 70. Shank 70 may be tapered to fit a corresponding socket in third member 26. Shank 70 may be square or rectangular in section. It is convenient, however, that it be circular in section, such that its overall shape is that of a truncated conical section. Shank 70 may have a central bore 72. Central bore 72 may be blind. In some embodiments, bore 72 may admit the circulation of coolant.

Third member 26 defines a base. It has a body 80, which may have a substantially cubic form.

In some embodiments, body 80 may have two parts, a first, or forward, part 82 and a second, or rearward, part 84. Second part 84 may be of a similar shape, and may nest within the rearward portion of first part 82, which is hollow. The forward end of first part 82 has a fitting 86 at which second member 24 and third member 26 engage. In the embodiment shown in FIG. 4D, fitting 86 is a tapered socket into which tapered shank 70 seats. First part 82 also has grounding strap attachment fittings 88. In the embodiment shown, fitting 88 is a threaded bore into which the mating threaded terminal of a grounding strap 90 may be tightly secured.

First part 82 has a rearwardly facing internal chamber 74 defining an accommodation into which to receive the forward portion of second part 84. First part has a rearwardly extending central post 92. The distal end of post 92 is threaded, as at 94. The forward portion of body 80 has a set of four blind bores 96 formed therein defining accommodations or seats in which to receive biasing members in the nature of springs 98.

Second part 84 has a corresponding set of accommodations or seats, in the form of blind bores 100, in which to receive the rearward end of springs 98. Second part 84 also has a central bore 102 that receives post 92, and allows threads 94 to be rearwardly exposed. A fastener, such as a locknut, is tightened on threads 94, such that springs 98 are captured between parts 82 and 84. As may be understood, the combined lengths of blind bores 96 and 100 is less than the undeflected length of springs 98. As the nut is tightened on threads 94, it draws parts 82 and 84 together, thus imposing a pre-load on springs 98. When apparatus 20 is installed on a tool or tool holder such as a pneumatic or hydraulic actuator, or a robot arm, the tool holder receives part 84. When the tool holder advances to cause apparatus 20 to engage the workpiece, continued forward motion will cause displacement of first part 82 rearwardly onto second part 84, causing further compression of springs 98. The reaction to that compression is provided by the engagement of tips 52 with the work piece. Thus the loading of spring 98 imposes a holding force on tips 52. In an alternate embodiment, the arrangement of four springs can be replaced by use of a single coil spring mounted about post 92, in the manner of a coaxially mounted spring about an automotive shock-absorber. In this respect, the entire assembly of third portion 26 may also be referred to as a "biasing member" relative to first and second members 22 and 24. In some embodiments apparatus 20 may include transducers to validate the force applied by biasing member 26.

Figure 2:
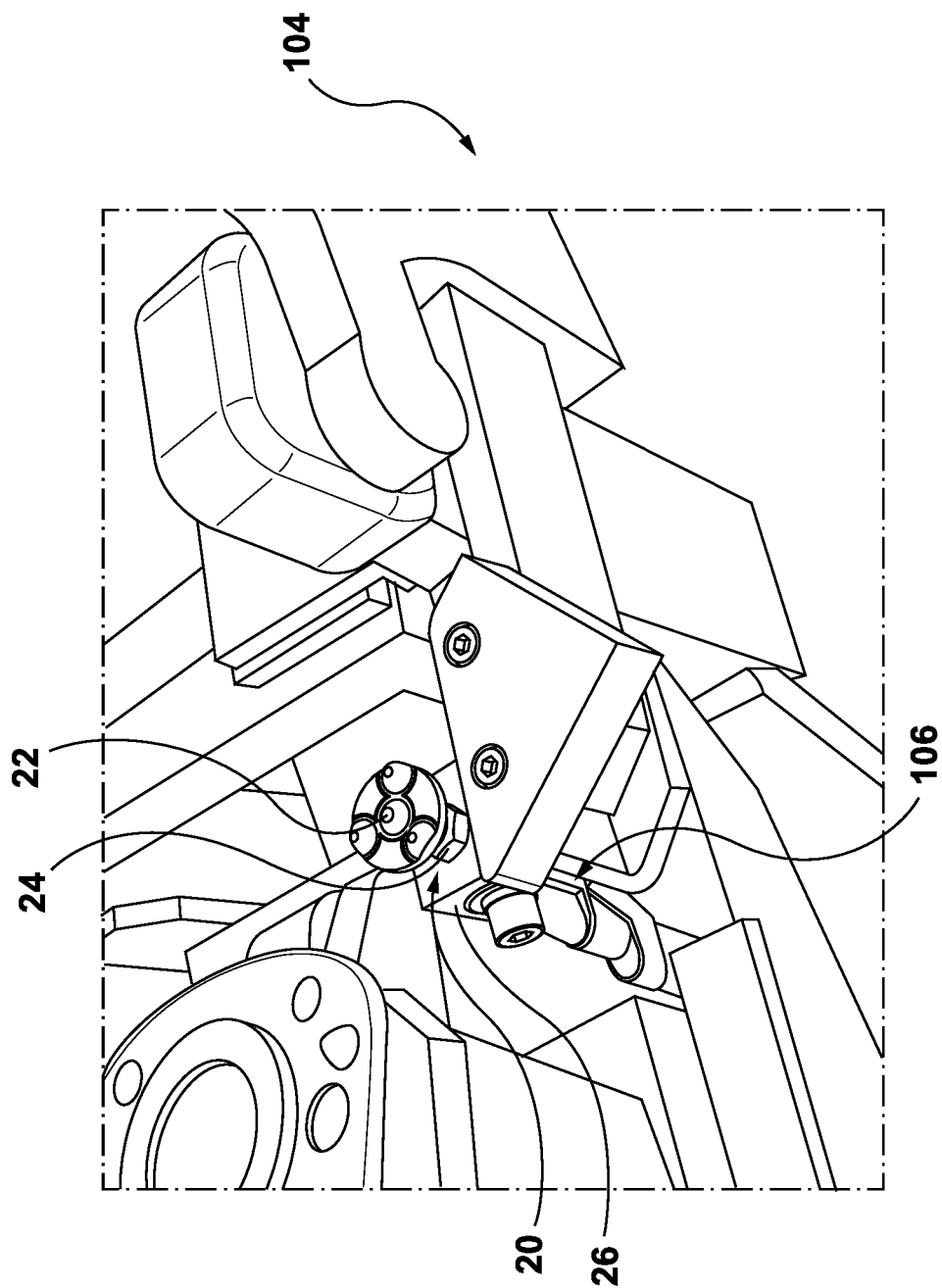
FIG. 2 shows a perspective view of the welding ground apparatus of FIG. 1 mounted on a robotic welding machine.

As shown in perspective view in FIG. 2, welding ground apparatus 20 may be secured to the arm 106 of an industrial robot 104. Arm 106 may be secured to biasing member, third portion 26, and may be secured substantially opposite second member 24. Arm 106 may permit industrial robot 104 to actuate the apparatus 20 toward, and away from, a workpiece target surface as may be. A programmable computer and sensors may be used to determine whether tips 52 are in contact with the workpiece, and to what extent springs 98 have been compressed in terms of displacement of mart 82 relative to part 84. In the engagement process, first portion 22 may pivot or swivel, or be angularly displaced, to conform to the shape and orientation of the workpiece.

Figure 3:
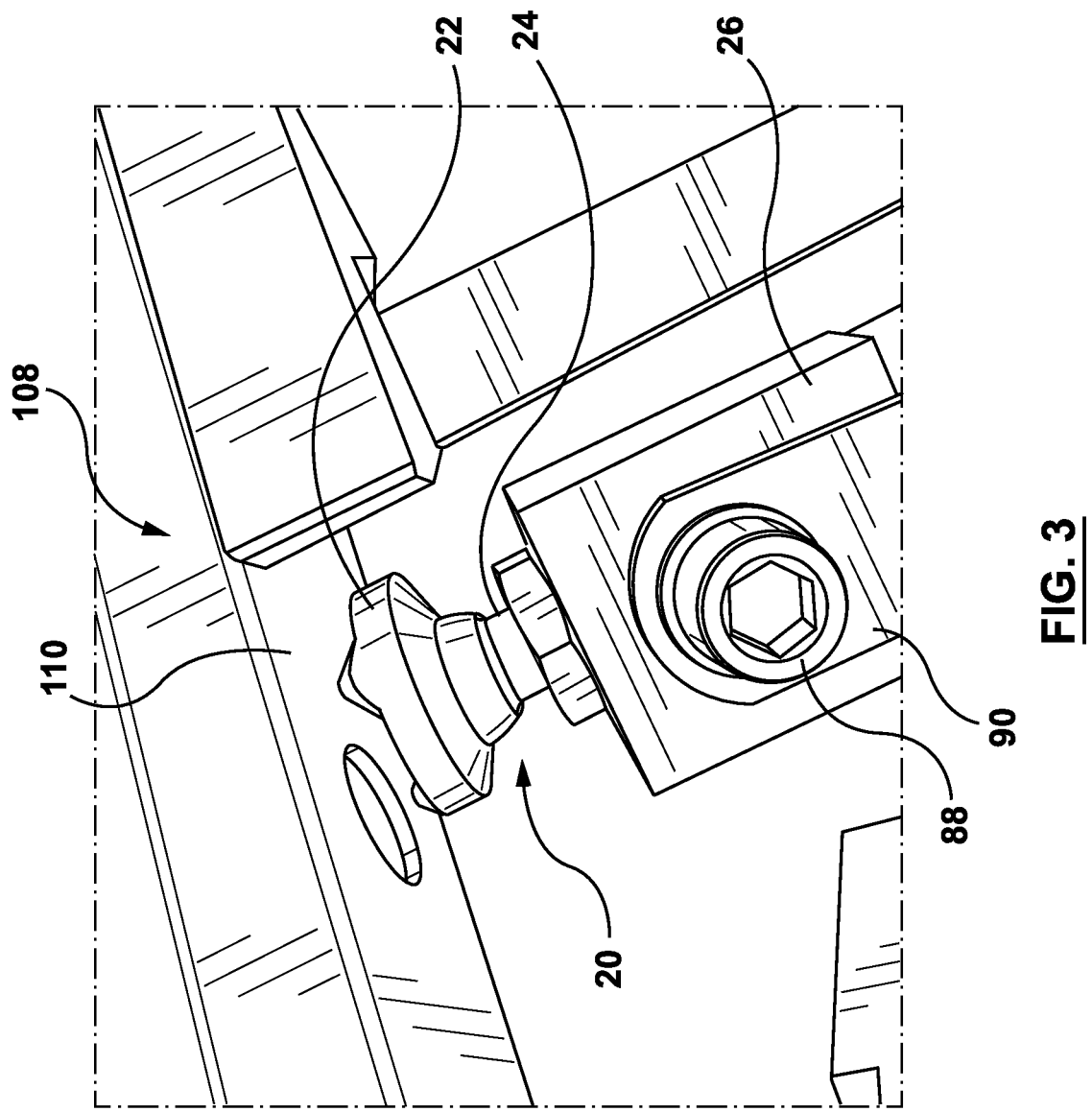
FIG. 3 shows a perspective side view of the welding ground apparatus of FIG. 2 applied to a target surface.

As shown in FIG. 3, arm 106 may permit industrial robot 104 to ground a workpiece 108 by contacting apparatus 20 with target surface 110 of workpiece 108. Industrial robot 104 may hold apparatus 20 in place against workpiece 108 while welding occurs. Industrial robot 104 may permit apparatus 20 to be applied using a known pressure so that apparatus 20 (and particularly not tips 52 thereof) is not (or are not) crushed into workpiece 108, as might otherwise happen by a person over-tightening a clamp.

As shown in FIGS. 4A to 6, first member 22 and second member 24 of the welding ground apparatus 20 may form a contact head. First member 22 may define contact footprint 112 having footprint periphery or perimeter 50. First member 22 may have a several feet 42, 44, 46, which may define the footprint 112. The use of several feet rather than a larger flat contact surface may concentrate pressure into smaller areas of contact or tips 52 on target surface 110. Further, since the contact head swivels, it can adjust to the shape and orientation of target surface 110. Contact at the statically determinate footprint may result in less resistance or heat generated and less arcing. In some circumstances such an apparatus may also be helpful or required to exert the same pressure to the same surface area every time it is applied as a matter of consistent production practice. In some circumstances such an apparatus may also be required to be highly conductive yet durable. In some circumstances the contact surface of such an apparatus must be maintained in a clean state for stable welding performance.

The use of three feet may ensure that when first member 22 is actuated against target surface 110, the connection between first member 22 and target surface 110 is stable, i.e., statically determinate. Three feet may also ensure that when first member 22 is pressed against target surface 110, which may be a misaligned or curved surface, each of the feet is in direct contact with the surface. Pressure exerted in the center, or at the centroid of the three points of contact may result in a relatively even distribution of load, as first member 22 is free to swivel relative to second member 24. This may result in a contact head that can substantially self-align with a non-flat surface. Each foot may have a contact surface, tip 52, the set of feet 40 defining a set of contact surfaces that lie in a common contact plane. The contact surfaces may be flat surfaces, as sharp asperities may dig into or otherwise deface the target surface.

The set of feet 40 may also provide a tendency toward a self-cleaning function. That is, each foot may have a draft angle, namely the slope of flank 54, allowing weld spatter, dust, or dirt to be pushed away from the contact surface. For example, each foot may have a draft angle of 45 degrees tapering from the base of the foot at plate 38 to the contact surface at tip 52. An operator may also visually inspect the contact head to determine whether further cleaning may be necessary. As feet 40 wear down over time, a visual inspection of their height may provide an operator with an indication of whether replacement is needed.

In some embodiments feet 40 may each be approximated as truncated cones or frustums, with roughly a ½ inch diameter base, approximately 3/16 inches in height, and tapering at a 45 degree angle to the contact surface at the end. In some embodiments the contact surface may be in the range of about 1/10 or 1/8 to 3/16 inches in diameter.

The central axis of each foot may be inset about 1/78 to 3/16 inches from the circular upper surface periphery of plate 38, and the volume of each frustum which would extend beyond the edge of the circular upper surface periphery is removed.

Reference projection 56 may define a reference projection axis traversing the contact footprint 112, within the footprint periphery or perimeter 50. That projection axis may also be the centerline axis of first member 22. Reference projection 30 may be centered in the contact footprint 22, and centered between the plurality of feet 26. Reference projection 30 may have a height less than the height of the plurality of feet 26, such that the common contact plane defined by the contact surfaces 28 may lie beyond the extension of the reference projection. The distance from the end of the reference projection to the common contact plane may be a known reference distance 34. In some embodiments reference projection 56 may be about 1/10 inches in height.

Second member 24 may also have an interior space with a port from the exterior surface. The interior space may be provided to permit a fluid, such as a liquid coolant, to flow through second member 24. First member 22 and second member 24 may be made of a material that is predominantly chromium zirconium copper as chromium zirconium copper has high electrical conductivity, solidity, and ductility, moderate strength, and is resistant to softening at elevated temperatures.

Figure 7:
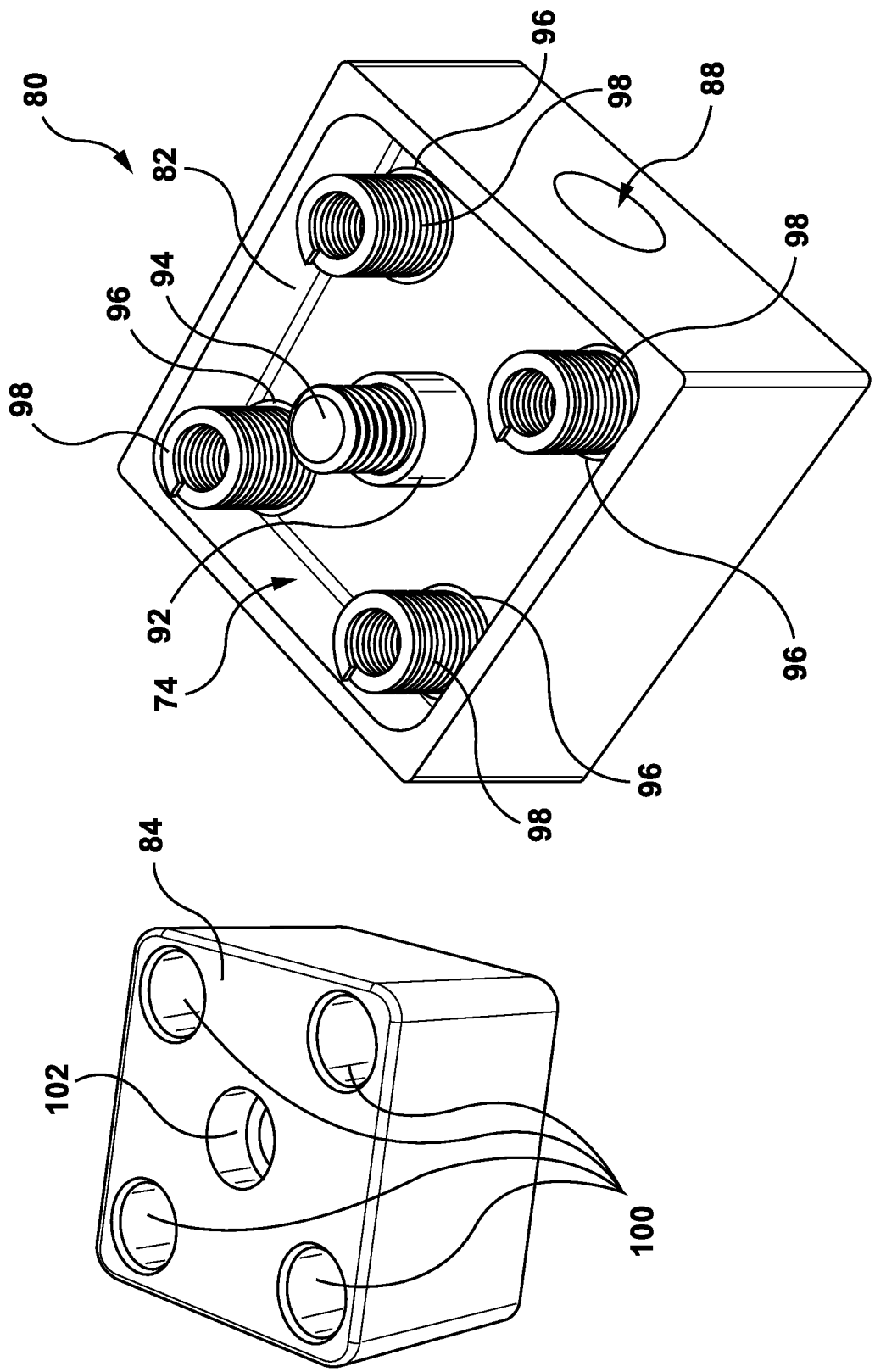
FIG. 7 shows an exploded view of a biasing member of the welding ground apparatus of FIG. 1.

Second member 24 may also be engaged with the biasing member, i.e., third member 26. Biasing member 26, depicted in FIG. 7, may be provided to apply a force to the second member 24 when biasing member 26 is compressed, the line of action of the force traversing the contact footprint within the footprint periphery and preferably traversing the contact footprint in the center of the footprint.

In some embodiments, springs 98 may include four independent springs, spaced substantially regularly and substantially equally from, and parallel to, the axis of apparatus 20, when the axis of apparatus 20 is a longitudinal axis through second member 24 and biasing member 26. First and second parts 82 and 84 may be restrained from separating from one another beyond a biasing member extension distance. First and second parts 82 and 84 may also be made of a material that is predominantly chromium zirconium copper. Second part 84 may also has a fitting to attach to arm 106 of industrial robot 104.

In operation, industrial robot 104 may apply apparatus 20 to workpiece 108 by actuating, i.e., moving, apparatus 20 towards target surface 112 until each of feet 40 touch target surface 112, which may involve pivoting or swiveling rotation of first member 22 relative to second member 24. Industrial robot 104 may then determine a compression distance as the distance between reference projection 56 and target surface 112. Industrial robot 104 may then move second biasing member part 84 towards target surface 112 by the compression distance, compressing the biasing member 26 and moving the springs 98 into a second compressed state. The compressed state of biasing member 26 may cause biasing member 26 to apply a force to second member 24, the line of action of the force traversing the contact footprint periphery or perimeter 50.

Figure 8:
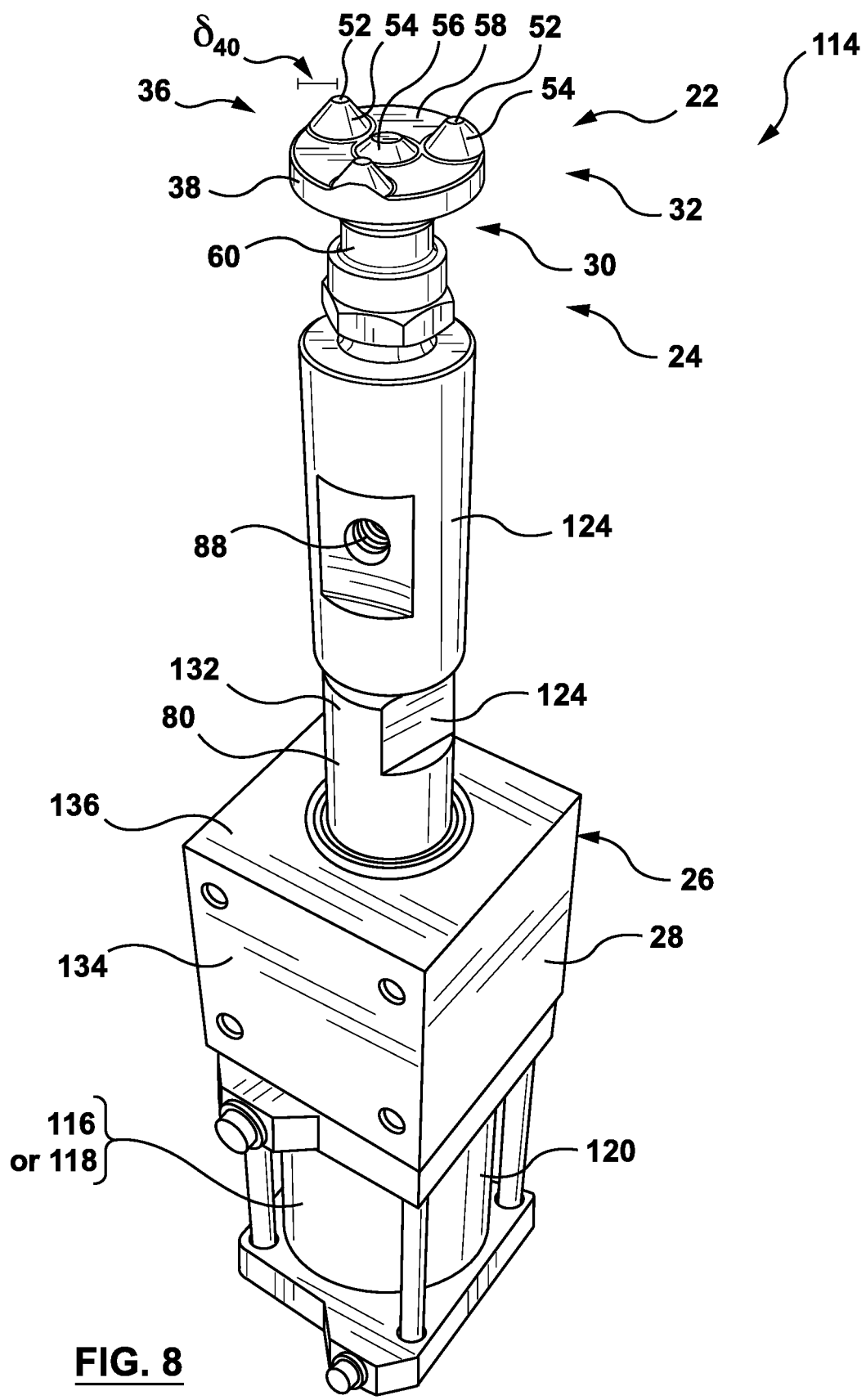
FIG. 8 shows a perspective view of an alternate welding ground apparatus to that of FIG. 1.
Figure 9:
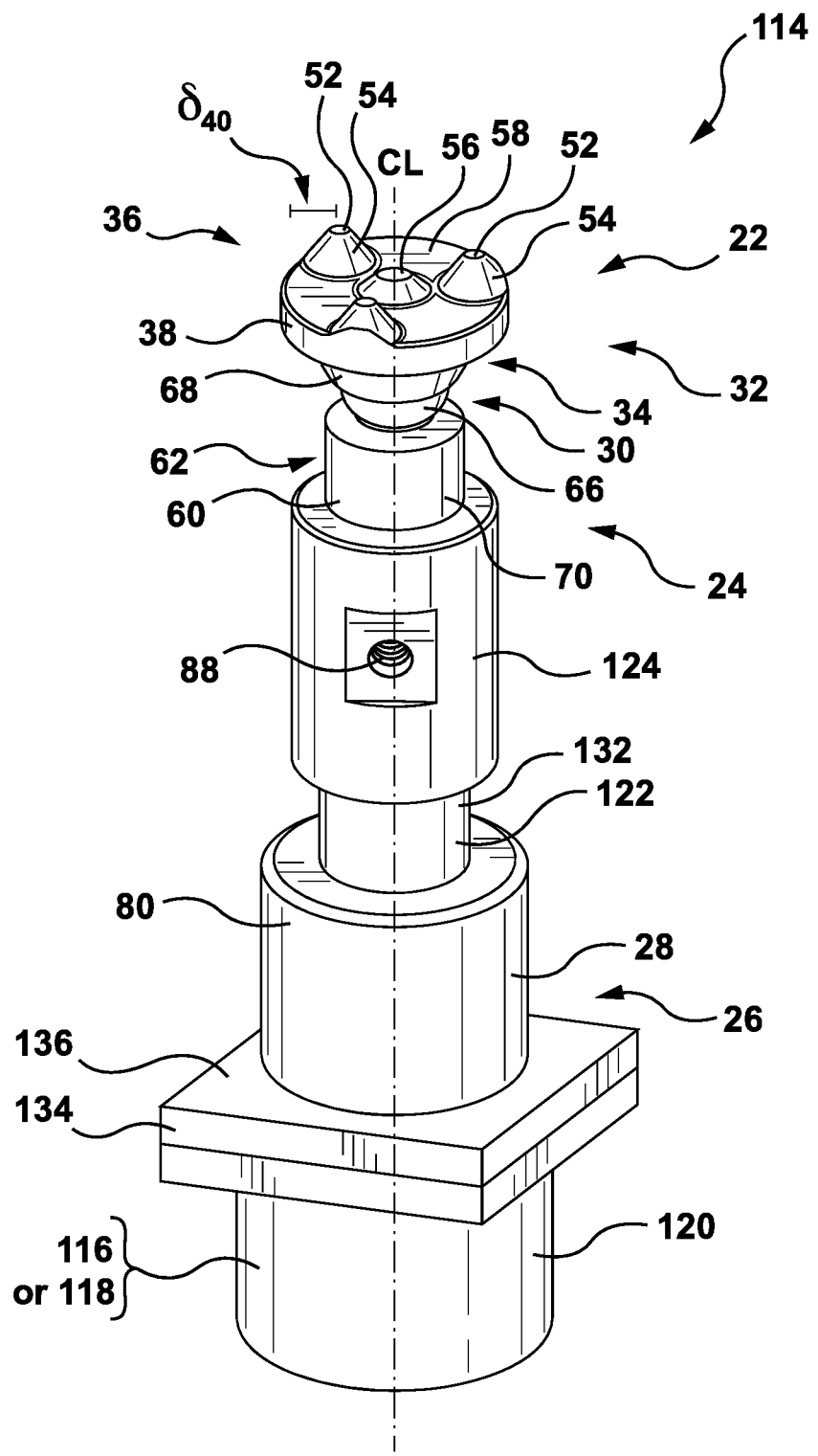
FIG. 9 is a perspective side view of the welding ground apparatus of FIG. 8.
Figure 10:
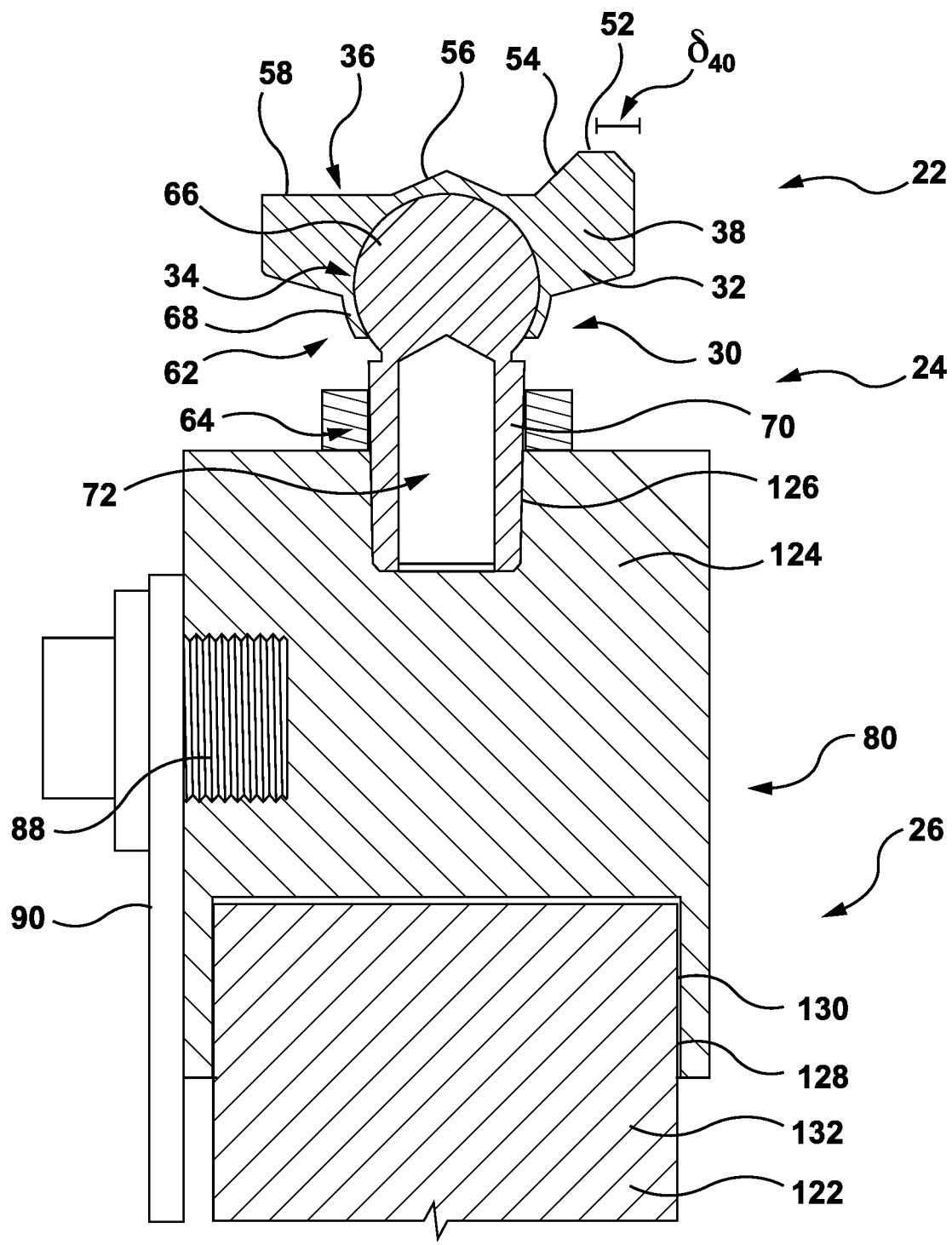
FIG. 10 shows a cross section of the forward portion of the welding ground apparatus of FIG. 8.

In the alternate embodiment of FIGS. 8 to 10, a welding ground apparatus 114 may have a biasing member 26 that employs either a servo motor 116, or a pressurized fluid operated actuator 118. In the case of a servo motor, which has its own internal feedback control operable to monitor any or all of displacement, speed, or applied force, separate force and position transducers may not be required to validate the force applied by the biasing member 26. Furthermore, a servo motor may be employed without the intermediate medium of springs. Alternatively, pressurized fluid operated actuator 118 may be a pneumatic cylinder. An example of such a cylinder such as may be represented actuator 118 is sold by Welker Engineering Products of Troy, Mich. as the GB3 Ground Block Retract Cylinder. This apparatus does not require additional external transducers, and does not employ a set of internal compression springs. That is, in either embodiment, apparatus 114 may be free of resilient members between the linear actuator, be it servo motor 116 or actuator 118 and the swiveling head of second member 24.

Whether employing an electric servo motor 116, or a pneumatic actuator as actuator 118, body 80 may have two parts, a cylinder 120 and a mating cylinder rod 122. Cylinder 120 and cylinder rod 122 may be assembled co-operably to form a pressurized actuator, such as a pneumatic cylinder, or any form of linear actuator, such as a servo motor. Linear actuators may be validated, compensated for, switched, retracted, and extended, such that an operator using apparatus 20 has control over the force applied by biasing member 26. The forward end of cylinder rod 122 has a fitting 124 at which second member 24 engages, in place of third member 26. In the embodiment shown in FIGS. 8, 9, and 10, fitting 124 is an adapter having a socket 128 to receive the body 132 of cylinder rod 122, which socket 128 may include threading 130 corresponding to threading on cylinder rod body 132. Adapter 124 also contains a tapered socket 126 into which tapered shank 70 seats. Adaptor 124 has grounding strap attachment fittings 88. Fitting 88 is a threaded bore into which the mating threaded terminal of a grounding strap 90 may be tightly secured.

First member 22 may be electrically insulated from the tool, or robot, which holds the welding ground apparatus 20, such that the welding ground apparatus 20 may be mounted directly without requiring an operator having to add insulation between the apparatus 20 and the tool or robot to eliminate feedback chatter in the fixture, such as between welds. To that end, in the embodiment shown in FIGS. 8, 9, and 10, first member 22 may be electrically insulated from mounting surface 134 of mounting member 136. Mounting member 136 could be made of an insulating material.

Various embodiments have been described in detail. Since changes in and or additions to the above-described examples may be made without departing from the nature, spirit or scope of the invention, the invention is not to be limited to those details.

The invention claimed is:

1. A grounding apparatus, comprising: a first member defining a contact footprint, the contact footprint having a footprint periphery; a second member engaged with the first member and having at least a first angular degree of freedom relative to the first member; and a biasing member mounted to apply a force to the second member along a line of action when compressed, the line of action of the force traversing the contact footprint within the footprint periphery; said first member includes a plurality of feet and said contact footprint is defined by said plurality of feet; said plurality of feet defines a plurality of contact surfaces, said contact surface being located in a common contact plane; the plurality of contact surfaces are a plurality of flat contact surfaces; the first member further includes a reference projection, the axis of the reference projection traversing the contact footprint within the footprint periphery; and said common contact plane lies axially proud of the extension of the reference projection.

2. The grounding apparatus of claim 1, wherein the second member has at least a second angular degree of freedom relative to the first member.

3. The grounding apparatus of claim 1, wherein one of the first member and the second member defines a male fitting and the other defines a female fitting, and the first and second members are engaged at a joint formed by the male and female fittings.

4. The grounding apparatus of claim 3, wherein the male fitting is a ball fitting and the female fitting is a socket fitting.

5. The grounding apparatus of claim 1, wherein the first member engages the second member substantially opposite the contact footprint.

6. The grounding apparatus of claim 1, wherein said plurality of contact surfaces are a plurality of flat circular contact surfaces having a diameter of at least 1/10 inches.

7. The grounding apparatus of claim 1, wherein the plurality of contact feet are evenly spaced about the footprint periphery.

8. The grounding apparatus of claim 1, wherein the reference projection is centered between the plurality of feet.

9. The grounding apparatus of claim 8, wherein at least one of:
(a) at least one spring comprises at least three springs equally distant from, and parallel to, the axis of the biasing member, the at least three springs spaced regularly from one another; and
(b) the plurality of feet is three feet evenly spaced about the footprint periphery, each of the three feet having a circular contact surface, the second member having a tapered shaft for insertion into the biasing member, and the second member having an interior space, an exterior surface, and a port extending from the interior space to the exterior space, the port being at the end of the tapered shaft.

10. The grounding apparatus of claim 1, wherein the first and second members are made of a material that is predominantly copper.

11. The grounding apparatus of claim 1, wherein the second member defines an exterior surface and an interior space with a port extending from the interior space to the second exterior surface; and the interior space extends along substantially the entire length of the second member.

12. The grounding apparatus of claim 1, wherein the biasing member includes a first biasing member, a second biasing member, and at least one spring, the first biasing member and the second biasing member restrained from separating from one another beyond a biasing member extension distance, and the at least one spring captured between the first biasing member and the second biasing member.

13. The apparatus of claim 1, wherein the biasing member includes a linear actuator.

14. The apparatus of claim 13 wherein at least one of:
(a) the linear actuator includes a servo motor; and
(b) the linear actuator includes a pneumatic cylinder.

15. A grounding apparatus, comprising:
a first member defining a contact footprint, the contact footprint having a footprint periphery;
a second member engaged with the first member and having at least a first angular degree of freedom relative to the first member;
a biasing member mounted to apply a force to the second member along a line of action when compressed, the line of action of the force traversing the contact footprint within the footprint periphery;
said first member includes a plurality of feet and said contact footprint is defined by said plurality of feet;
said plurality of feet defines a plurality of contact surfaces, said contact surface being located in a common contact plane;
the first member further includes a reference projection, the axis of the reference projection traversing the contact footprint within the footprint periphery;
said reference projection is centered between the plurality of feet; and
said common contact plane lies axially proud of the extension of the reference projection.

16. A grounding apparatus, comprising:
a first member defining a contact footprint, the contact footprint having a footprint periphery;
a second member engaged with the first member and having at least a first angular degree of freedom relative to the first member;
a biasing member mounted to apply a force to the second member along a line of action when compressed, the line of action of the force traversing the contact footprint within the footprint periphery;
said first member includes a plurality of feet and said contact footprint is defined by said plurality of feet;
said plurality of feet defines a plurality of contact surfaces, said contact surface being located in a common contact plane;
the first member further includes a reference projection, the axis of the reference projection traversing the contact footprint within the footprint periphery;
said reference projection is centered between the plurality of feet; and
said common contact plane lies at least 0.1 inch beyond the extension of the reference projection.

17. A grounding apparatus comprising: at least a first member and a second member, said first member and said second member being engaged; said second member defining a base; said first member including a workpiece engagement interface, said workpiece engagement interface having a plurality of feet, said plurality of feet defining a contact footprint; said feet being flat and lying in a common plane; there being at least one angular degree of freedom between the first member and the second member when so engaged; said second member being movable along a line of action, the line of action traversing said contact footprint; the first member further includes a reference projection, the axis of the reference projection traversing the contact footprint within the footprint periphery; and said common contact plane lies axially proud of the extension of the reference projection.

18. A method of using the grounding apparatus of claim 17, comprising: contacting each of the plurality of contact surfaces with a target surface; defining a compression distance as the distance between the reference projection and the target surface; and advancing the biasing member towards the target surface by the compression distance.

* * * * *